United States Patent
Bone

(10) Patent No.: US 8,388,040 B2
(45) Date of Patent: Mar. 5, 2013

(54) LOCK-OUT DEVICE FOR VEHICLE COMPARTMENT WITH LID

(75) Inventor: Jason C. Bone, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/075,489

(22) Filed: Mar. 30, 2011

(65) Prior Publication Data

US 2012/0248808 A1  Oct. 4, 2012

(51) Int. Cl.
*B60R 7/00* (2006.01)

(52) U.S. Cl. ................ 296/37.1; 296/37.8; 292/DIG. 22

(58) Field of Classification Search ............... 296/37.13, 296/37.1, 37.8
See application file for complete search history.

(56) References Cited

U.S. PATENT DOCUMENTS

| | | | | |
|---|---|---|---|---|
| 4,552,399 A * | 11/1985 | Atarashi | ................... | 296/37.12 |
| 6,024,900 A * | 2/2000 | Saito et al. | ................... | 264/29.6 |
| 7,487,884 B2 * | 2/2009 | Kim | ............................. | 220/827 |
| 7,669,288 B2 * | 3/2010 | Zeilbeck et al. | ............... | 16/354 |
| 7,845,701 B2 * | 12/2010 | Muller | ......................... | 296/37.1 |
| 7,959,202 B2 * | 6/2011 | Ahn | ............................. | 296/37.8 |

* cited by examiner

*Primary Examiner* — Dennis Pedder
(74) *Attorney, Agent, or Firm* — Quinn Law Group, PLLC

(57) ABSTRACT

A lock-out device is provided for a vehicle compartment having a lid. The lock-out device allows a closed compartment lid to remain closed during an acceleration event, without the use of a latch. The lock-out device includes a pivoted drive member operatively connected to the lid and rotatable between two positions, a first drive position that closes the lid and a second drive position that opens the lid. The device includes a pivoted lock member rotatable between a rest position and a lock-out position. A lock biasing member is provided to bias the lock member toward the rest position. The lock member rotates to the lock-out position in response to the acceleration force overcoming a biasing force of the lock biasing member. The lock member in the lock-out position is configured to lock the drive member in the first drive position.

15 Claims, 3 Drawing Sheets

LOCK-OUT DEVICE FOR VEHICLE COMPARTMENT WITH LID

TECHNICAL FIELD

The invention relates generally to a vehicle compartment having a lid and, more specifically, to a lock-out device for the vehicle compartment.

BACKGROUND

A vehicle may include a storage compartment with a lid that may be slidably opened and closed. Unless the storage compartment lid is latched in the closed position, an acceleration event may force open the storage compartment lid.

SUMMARY

A lock-out device is provided for a vehicle compartment having a lid. The lock-out device allows a closed compartment lid to remain closed during an acceleration event, without the use of a latch. The lock-out device includes a pivoted drive member operatively connected to the lid and rotatable between two positions, a first drive position that closes the lid and a second drive position that opens the lid. The device includes a pivoted lock member rotatable between a rest position and a lock-out position. A lock biasing member is provided to bias the lock member toward the rest position. The lock member rotates to the lock-out position in response to the acceleration force overcoming a biasing force of the lock biasing member. The lock member in the lock-out position is configured to lock the drive member in the first drive position.

The above features and advantages and other features and advantages of the present invention are readily apparent from the following detailed description of the best modes for carrying out the invention when taken in connection with the accompanying drawings.

DETAILED DESCRIPTION

Figure 1:
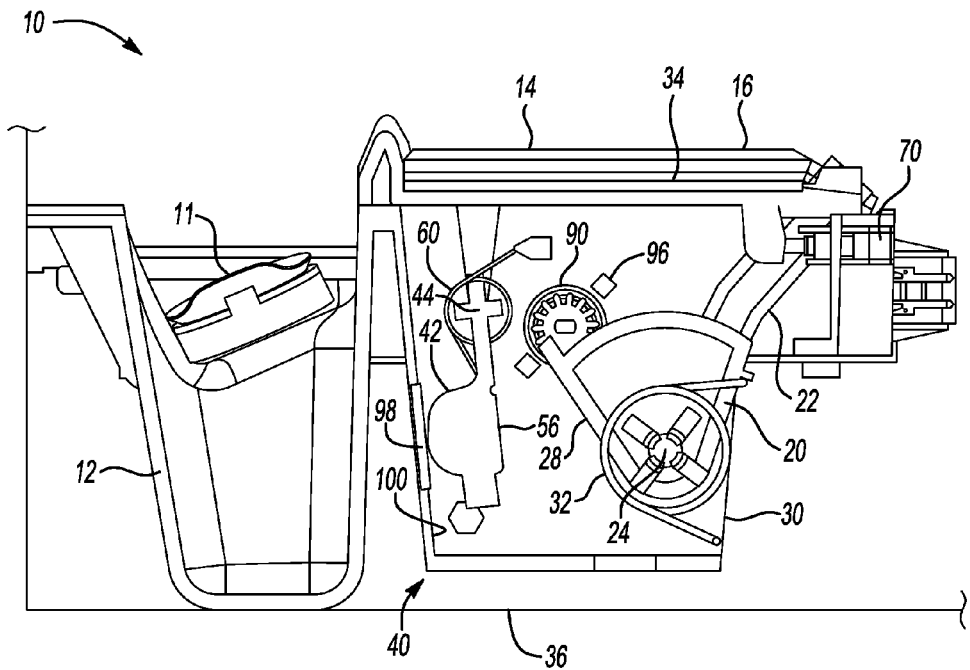
FIG. 1 is a schematic fragmentary side view of a portion of a vehicle having a lock-out device for a compartment with a lid, where the lid is open and a lock member of the device is in a rest position.
Figure 2:
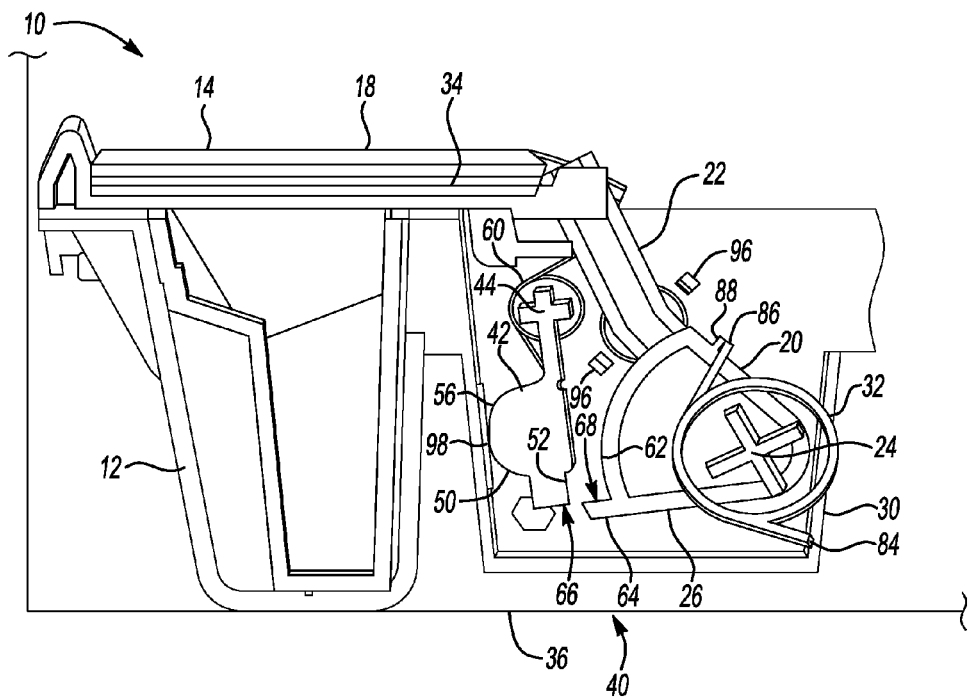
FIG. 2 is a schematic fragmentary side view of the lock-out device of FIG. 1, where the lid is closed and the lock member is in the rest position.

Referring to the drawings, wherein like reference numbers refer to like components throughout the several views, FIG. 1 shows a portion of a vehicle 10 having a compartment 12 with a lid 14. The compartment 12 may be used as a storage compartment (as shown in FIG. 2) or as a storage compartment with an outlet 11 for power (shown in FIG. 1) or as an ashtray with an outlet 11 (shown in FIG. 1) for a cigarette lighter. FIG. 1 shows the lid 14 in an open position 16 while FIGS. 2-5 show the lid 14 in a closed position 18. Referring to FIGS. 1-5, a drive member 20 is operatively connected to the lid 14. The drive member 20 includes a drive arm 22 operatively connected to the lid 14. The drive member 20 pivots about a first pivoting point 24 (shown in FIGS. 1-3). The drive member 20 is rotatable between two positions; a first drive position 26 corresponding to the closed position 18 (shown in FIGS. 2-4) of the lid 14 and a second drive position 28 corresponding to the open position 16 (shown in FIG. 1) of the lid 14. The drive member 20 is placed within a housing 30, shown in FIGS. 1-3.

Figure 3:
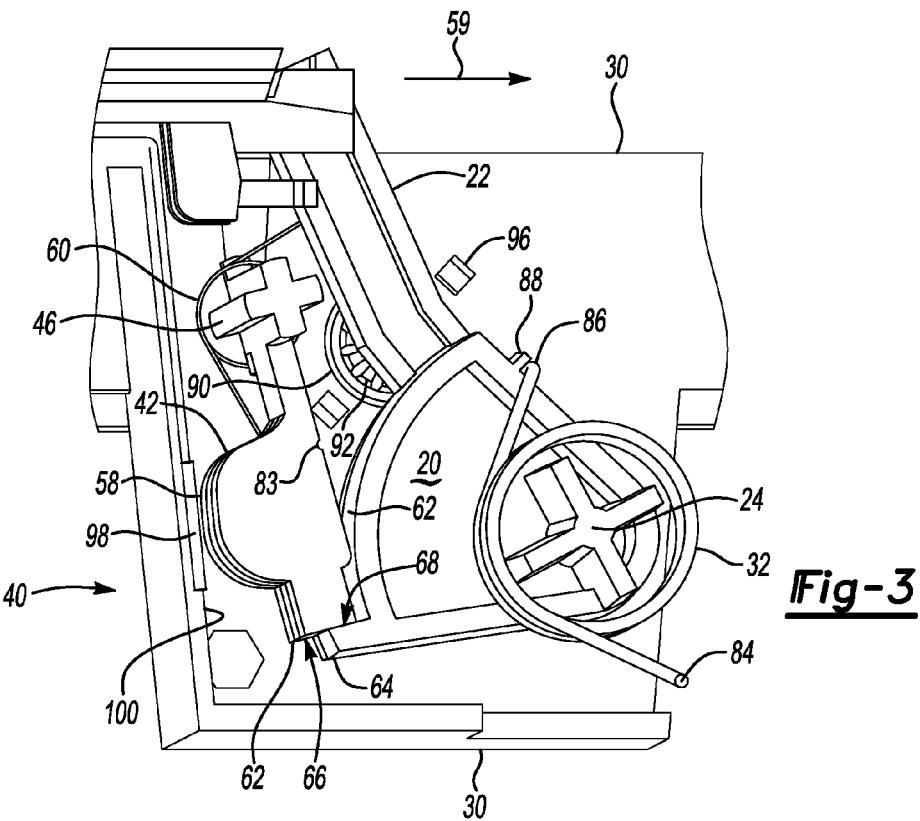
FIG. 3 is a schematic fragmentary perspective side view of the lock-out device of FIG. 1, where the lid is closed and the lock member is in a lock-out position.
Figure 4:
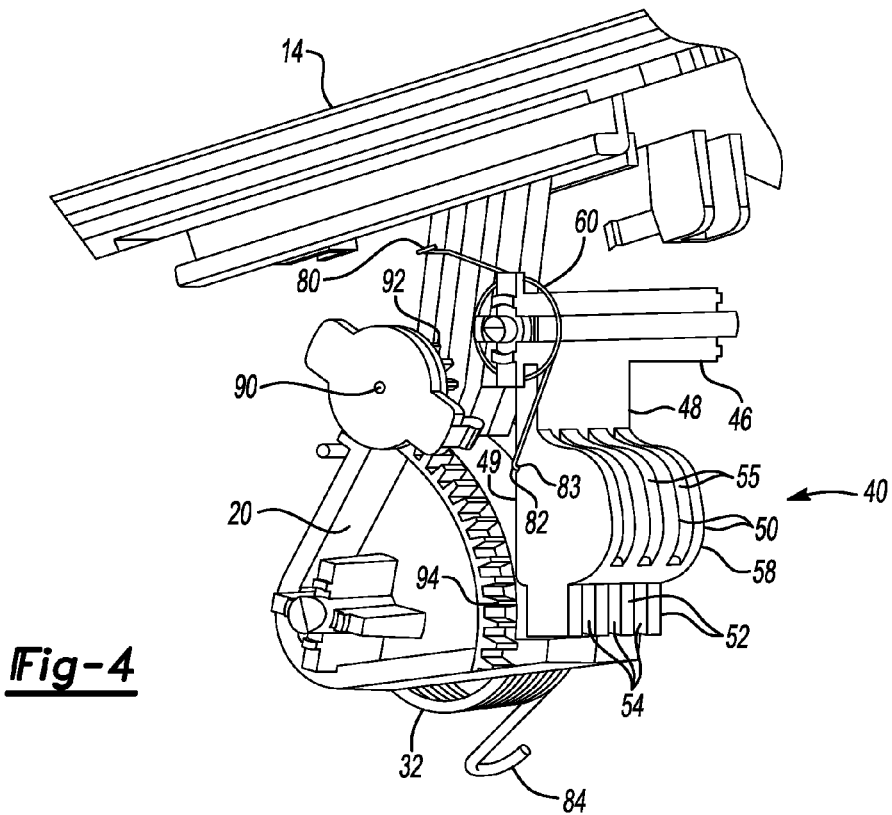
FIG. 4 is a schematic fragmentary perspective side view of the lock-out device, opposite to the side shown in of FIG. 3, where the lid is closed, the lock member is in the lock-out position and the housing is removed for clarity.
Figure 5:
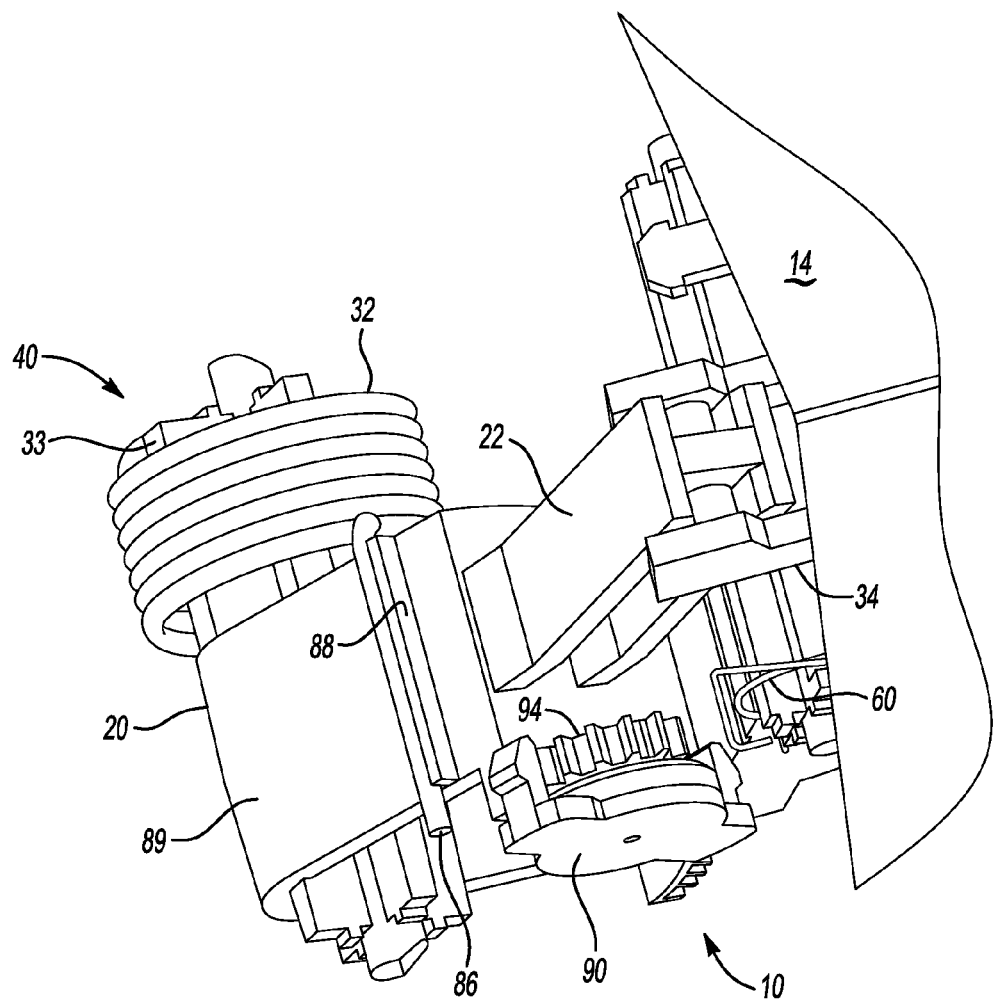
FIG. 5 is a schematic fragmentary perspective top view of the lock-out device of FIG. 1. For clarity, only a portion of the lid is shown.

Referring to FIGS. 1-5, a drive biasing member 32 provides a closing force to keep the lid 14 in the closed position 18. In one example, as shown in FIG. 5, the drive biasing member 32 is a torsion spring positioned at least partially around a pivoting arm 33 of the drive member 20. A user can overcome this closing force to open the lid 14 by manually sliding the lid 14 along a sliding track 34 (shown in FIGS. 1-2), thereby rotating the drive member 20 to the second drive position 28. Referring to FIGS. 1-2, the compartment 12 may be mounted to a component 36 of the vehicle 10. The component 36 may be the front console, door trim, panel center console, dashboard, trunk or other component.

Referring to FIGS. 1-5, a lock-out device 40 is shown that is configured to keep the lid 14 in the closed position 18 during a high acceleration event, without the use of a latch or lock. The high acceleration event may be caused by an impact force or any other source. The lock member 42 is rotatable between a rest position 56 (shown in FIGS. 1-2) and a lock-out position 58 (shown in FIGS. 3-4). FIG. 1 shows the lid 14 in the open position 16 and the lock member 42 in the rest position 56. FIG. 2 shows the lid 14 in the closed position 18 and the lock member 42 in the rest position 56. FIG. 3 shows the lid 14 in the closed position 18 and the lock member 42 in the lock-out position 58. FIG. 4 shows the opposite side of FIG. 3, where the housing 30 is removed for clarity.

Referring to FIGS. 1-4, the lock-out device 40 includes a lock member 42 placed within the housing 30. The lock member 42 pivots about a second pivoting point 44, shown in FIGS. 1-2. As best shown in FIG. 4, the lock member 42 has a pivoting arm 46, a first face 48 and a second face 49 (facing the drive member 20). The lock member 42 includes one or more jutting portions 52 separated by a well-defined second gap 54. The second gap 54 between adjacent jutting portions 52 may be the same or may be different. Optionally, the first face 48 may include one or more curved edges 50 that are separated by a well-defined first gap 55, as shown in FIG. 4. The first gap 55 between adjacent curved edges 50 may be the same or may be different.

In the rest position 56, the lock member 42 is held away from the drive member 20 through the use of a lock biasing member 60, shown in FIGS. 1-5. The lock biasing member 60 may be a torsion spring, as shown in FIGS. 1-5. Alternatively, the lock biasing member 60 may be a constant force extension spring (not shown) that prevents uncoiling except under a constant force. As best shown in FIG. 4, the lock biasing member 60 is positioned at least partially around the pivoting arm 46 of the lock member 42. When the vehicle 10 is moving on an uneven surface or over a pothole, the lock biasing member 60 keeps the lock member 42 in its rest position 56. Referring to FIG. 3, the drive member 20 includes a first wall 62 with a step portion 64 that extends away from the first wall 62. The step portion 64 defines a step surface 68. The step surface 68 and step portion 64 may extend along the first wall 62 of the drive member 20 in a direction perpendicular to the longitudinal or fore-and-aft direction of the vehicle 10.

In the case of the occurrence of an acceleration event, as represented by arrow 59 in FIG. 3, the lock member 42 rotates or swings to the lock-out position 58. Each of the jutting portions 52 of the lock member 42 define a jutting surface 66 that is configured to contact the step surface 68 defined by the step portion 64 of the drive member 20. The local contact stress between each jutting surface 66 of the lock member 42 and the step surface 68 of the drive member 20 locks the drive member 20 in a fixed position with respect to the housing 30. In other words, the drive member 20 is locked in the first drive position 26, which corresponds to the closed position 18 (shown in FIG. 2-4) of the lid 14. Because the drive member 20 is locked in the first drive position 26, the lid 14 in the closed position 18 is prevented from sliding open without requiring that the lid 14 be latched closed. Optionally, referring to FIG. 1, the lid 14 may be held open or latched in the open position 16 through a latch member 70. The acceleration force must overcome a biasing force of the lock biasing member 60. When the acceleration ceases, the biasing force of the lock biasing member 60 causes the lock member 42 to rotate to its rest position 56.

The shape and mass distribution of the lock member 42 is selected to utilize the available packaging space. The shape and mass distribution of the lock member 42 determines the center of gravity and stability of the lock member 42. One of ordinary skill in the art may select a lock biasing member 60 and a lock member 42 suitable for a particular application. By way of example only, one may select a lock member 42 having a mass of approximately 9 grams and a center of gravity that is approximately 12.6 mm below the pivot point 44, thereby creating a torque of approximately 1.1 Nmm. By way of example only, one may select a lock biasing member 60 with a maximum torque of 2 Nmm. Since the maximum torque of the lock biasing member 60 (2 Nmm) is greater than the torque created by the lock member 42 (1.1 Nmm), the lock member 42 would remain in the rest position 56 (shown in FIGS. 1-2) under normal conditions. If an acceleration that is 30 times the gravitational acceleration (referred to herein as 30 g) is applied, the torque of the lock member 42 would increase to 33 Nmm, exceeding the maximum torque of the lock biasing member 60 and the lock member 42 would rotate to the lock-out position 58 (shown in FIGS. 3-4). The minimum acceleration needed to move the lock member 42 in this example would be 1.83 g.

Referring FIG. 4, the lock biasing member 60 may have a first leg 80 operatively connected to the housing 30 and a second leg 82 operatively connected to the lock member 42. Referring FIG. 4, a portion of the second leg 82 may rest in a slot 83 (shown in FIGS. 3-4) formed in the second face 49 (facing the drive member 20) of the lock member 42. Referring to FIGS. 2-3, the drive biasing member 32 may have a first leg 84 operatively connected to the housing 30 and a second leg 86 operatively connected to the drive member 20. As shown in FIG. 5, the second leg 86 may be secured in place by a raised portion 88 formed on a second wall 89 of the drive member 20.

Referring to FIGS. 1 and 3-5, a damper 90 is operatively connected to the housing 30 and configured to dampen the motion of the drive member 20. As shown in FIG. 4, this may be done by the teeth 92 of the damper 90 engaging with corresponding teeth 94 of the drive member 20. The damper 90 is retained in place by snaps 96, shown in FIGS. 1-5. Referring to FIGS. 1 and 3, an absorbing element 98 is operatively connected to a wall 100 of the housing 30, across from the first face 48 of the lock member 42. The absorbing element 98 is configured to absorb noise and vibrations produced by the motion of the lock member 42. The absorbing element 98 is positioned so that the curved edges 50 of the lock member 42 are pressed against the absorbing element 98 when moving in a direction away from the drive member 20. The absorbing element 98 may be composed of felt, viscoelastic materials or any other suitable material.

The lock member 42 may be composed of a metal such as steel or aluminum, a polymer or plastic such as polyoxamethylene, a fiberglass composite or any other suitable material. The lock member 42 may be formed using injection molding techniques. The lock member 42 may also be hydroformed, stamped, cast, extruded or otherwise manufactured. The lock member 42 may have a unitary or one-piece configuration or may be an assembly of components. In one example, the length of the lock member 42 is approximately 40 mm and the width of the lock member 42 at the widest point is approximately 50 mm. In summary, the lock-out device 40 allows the lid 14 to remain in a closed position 18 during an acceleration event (as depicted by arrow 59 in FIG. 3), eliminating the need for a separate latching device.

While the best modes for carrying out the invention have been described in detail, those familiar with the art to which this invention relates will recognize various alternative designs and embodiments for practicing the invention within the scope of the appended claims.

The invention claimed is:

1. A lock-out device for a vehicle compartment having a lid, the device comprising:
    a pivoted drive member operatively connected to the lid and rotatable between two positions, a first drive position that closes the lid and a second drive position that opens the lid;
    a pivoted lock member rotatable between a rest position and a lock-out position;
    a lock biasing member for biasing the lock member toward the rest position;
    wherein the lock member is configured to rotate to the lock-out position in response to an acceleration force overcoming a biasing force of the lock biasing member;
    wherein the lock member in the lock-out position is configured to lock the drive member in the first drive position;
    wherein the lock member includes at least one surface that is configured to contact a corresponding surface of the drive member when the lock member rotates to the lock-out position; and
    wherein the lock member includes a first face having a plurality of spaced-apart curved edges.

2. The device of claim 1, wherein the acceleration force is approximately 30 times the acceleration of gravity (30 g).

3. The device of claim 1, wherein the lock member includes:
    a jutting portion contiguous with the first face and defining a jutting surface that is configured to contact the corresponding surface of the drive member when the lock member rotates to the lock-out position.

4. A lock-out device for a vehicle compartment having a lid, the device comprising:
    a pivoted drive member operatively connected to the lid and rotatable between two positions, a first drive position that closes the lid and a second drive position that opens the lid;
    a pivoted lock member rotatable between a rest position and a lock-out position;
    a lock biasing member for biasing the lock member toward the rest position;

wherein the lock member is configured to rotate to the lock-out position in response to an acceleration force overcoming a biasing force of the lock biasing member;

wherein the lock member in the lock-out position is configured to lock the drive member in the first drive position;

wherein the lock member includes a first face having a plurality of spaced-apart curved edges, the plurality of curved edges being separated by a first gap;

a plurality of jutting portions contiguous with the first face, the plurality of jutting portions being separated by a second gap; and wherein each of the plurality of jutting portions define a respective jutting surface that is configured to contact a corresponding surface of the drive member when the lock member rotates to the lock-out position.

5. The device of claim 1, wherein the drive member includes:
a first wall having a step portion extending away from the first wall; and
a step surface defined by the step portion and configured to contact the at least one surface of the lock member when the lock member rotates to the lock-out position.

6. The device of claim 1, further comprising:
a damper operatively connected to the housing;
wherein the damper includes teeth configured to engage with corresponding teeth of the drive member, thereby dampening motion of the drive member.

7. The device of claim 1, wherein the lock member is composed of polyoxamethylene.

8. The device of claim 1, wherein the lock biasing member is a torsion spring.

9. The device of claim 1, further comprising a drive biasing member positioned at least partially around a pivoting arm of the drive member and configured to bias the drive member in the first drive position.

10. The device of claim 1, wherein a portion of the lock biasing member is positioned within a slot formed in a face of the lock member.

11. The device of claim 1, wherein the lock member has a mass of 9 grams and a center of gravity that is approximately 12.6 mm below a pivot point of the lock member.

12. The device of claim 1, further comprising an absorbing element operatively connected to the housing and configured to absorb noise or vibrations produced by the lock member, wherein the plurality of spaced-apart curved edges of the lock member are configured to press against the absorbing element when the lock member moves away from the drive member.

13. The device of claim 12, wherein the absorbing element is composed of felt.

14. A vehicle comprising:
a compartment mounted to the vehicle and having a lid;
a pivoted drive member operatively connected to the lid and rotatable between two positions, a first drive position that closes the lid and a second drive position that opens the lid;
a pivoted lock member rotatable between a rest position and a lock-out position, wherein the lock member in the lock-out position is configured to lock the drive member in the first drive position;
a torsion spring for biasing the lock member toward the rest position;
wherein the lock member rotates to the lock-out position in response to an acceleration force overcoming a biasing force of the torsion spring;
wherein the lock member includes a plurality of spaced-apart jutting portions defining a plurality of jutting surfaces, respectively;
wherein a first face of the lock member has a plurality of spaced-apart curved edges; and
wherein the drive member includes a first wall with a step portion extending away from the first wall, the step portion defining a step surface configured to contact each of the plurality of jutting surfaces of the lock member when the lock member rotates to the lock-out position.

15. A lock-out device for a vehicle compartment having a lid, the device comprising:
a pivoted drive member operatively connected to the lid and rotatable between two positions, a first drive position that closes the lid and a second drive position that opens the lid;
a pivoted lock member rotatable between a rest position and a lock-out position;
a lock biasing member for biasing the lock member toward the rest position;
wherein the lock member is configured to rotate to the lock-out position in response to an acceleration force overcoming a biasing force of the lock biasing member;
wherein the lock member in the lock-out position is configured to lock the drive member in the first drive position;
wherein the lock member includes a first face having a plurality of spaced-apart curved edges; and
wherein the lid is slidable along a sliding track, the sliding track being substantially parallel to the acceleration force.

* * * * *